(12) United States Patent
Freemantle et al.

(10) Patent No.: US 10,871,207 B2
(45) Date of Patent: Dec. 22, 2020

(54) HYDRAULIC TENSIONER EXPANDABLE CLIP LOCK

(71) Applicant: BorgWarner, Inc., Auburn Hills, MI (US)

(72) Inventors: Paul Freemantle, Lansing, NY (US); SeongDo Hong, Ithaca, NY (US); Nicholas D. Andrus, Baldwinsville, NY (US)

(73) Assignee: BORGWARNER, INC., Auburn Hills, MI (US)

(*) Notice: Subject to any disclaimer, the term of this patent is extended or adjusted under 35 U.S.C. 154(b) by 345 days.

(21) Appl. No.: 16/052,979

(22) Filed: Aug. 2, 2018

(65) Prior Publication Data
US 2020/0040969 A1 Feb. 6, 2020

(51) Int. Cl.
*F16H 7/08* (2006.01)

(52) U.S. Cl.
CPC ....... *F16H 7/08* (2013.01); *F16H 2007/0812* (2013.01); *F16H 2007/0872* (2013.01); *F16H 2007/0878* (2013.01); *F16H 2007/0893* (2013.01)

(58) Field of Classification Search
CPC ........... F16H 2007/0806; F16H 7/0848; F16H 2007/0853; F16H 2007/0859; F16H 2007/0878
USPC .......................................................... 474/110
See application file for complete search history.

(56) References Cited

U.S. PATENT DOCUMENTS

| 4,792,322 | A | * | 12/1988 | Goppelt | F16H 7/08 474/136 |
| 5,370,584 | A | * | 12/1994 | Todd | F16H 7/08 474/110 |
| 5,704,860 | A | * | 1/1998 | Stief | F16H 7/08 474/110 |
| 5,885,179 | A | * | 3/1999 | Lewis | F16H 7/08 474/110 |
| 5,931,754 | A | * | 8/1999 | Stief | F01L 1/02 474/109 |
| 5,989,139 | A | * | 11/1999 | Dusinberre, II | F16H 7/08 474/110 |
| 6,120,402 | A | * | 9/2000 | Preston | F16H 7/08 474/109 |
| 6,244,981 | B1 | * | 6/2001 | Simpson | F16H 7/0848 474/110 |
| 6,916,264 | B2 | * | 7/2005 | Hashimoto | F16H 7/0848 474/109 |
| 6,935,978 | B2 | * | 8/2005 | Hayakawa | F16H 7/0836 474/109 |
| 7,186,195 | B2 | * | 3/2007 | Hellmich | F16H 7/0848 474/101 |

(Continued)

*Primary Examiner* — Henry Y Liu
(74) *Attorney, Agent, or Firm* — Reising Ethington P.C.

(57) ABSTRACT

A clip lock for securing an expandable clip of a chain tensioner includes an elongated member having a first surface configured to engage an exterior surface of the chain tensioner and a second surface, spaced apart from the first surface, that is configured to engage the expandable clip and maintain the expandable clip in contact with an annular groove of a chain tensioner component preventing radially-outward expansion and axial movement of the expandable clip with respect to the chain tensioner component while the first surface engages that exterior surface of the hydraulic tensioner and the second surface engages the expandable clip.

17 Claims, 4 Drawing Sheets

(56) References Cited

U.S. PATENT DOCUMENTS

| | | | | |
|---|---|---|---|---|
| 7,189,175 B2* | 3/2007 | Maino | F16H 7/0848 | 474/110 |
| 7,527,572 B2* | 5/2009 | Sato | F16H 7/0836 | 24/616 |
| 7,571,632 B2* | 8/2009 | Yamamoto | F16H 7/0848 | 72/370.21 |
| 7,641,576 B2* | 1/2010 | Redaelli | F16H 7/08 | 474/109 |
| 8,727,922 B2* | 5/2014 | Perissinotto | F16H 7/0848 | 474/110 |
| 8,888,624 B2* | 11/2014 | Bauer | F16H 7/0848 | 474/110 |
| 10,077,824 B2* | 9/2018 | Ishikawa | F16H 7/0836 | |
| 2003/0139235 A1* | 7/2003 | Yamamoto | F16H 7/0836 | 474/109 |
| 2004/0266571 A1* | 12/2004 | Izutsu | F16H 7/0848 | 474/110 |
| 2006/0094548 A1* | 5/2006 | Sato | F16H 7/0848 | 474/109 |
| 2006/0281595 A1* | 12/2006 | Narita | F16H 7/0848 | 474/109 |
| 2010/0016105 A1* | 1/2010 | Yoshimura | F16H 7/0848 | 474/110 |
| 2010/0222167 A1* | 9/2010 | Chekansky | F16H 7/0836 | 474/110 |
| 2011/0028253 A1* | 2/2011 | Perissinotto | F16H 7/0848 | 474/135 |
| 2011/0195810 A1* | 8/2011 | Perissinotto | F16H 7/0836 | 474/101 |
| 2012/0040790 A1* | 2/2012 | Perissinotto | F16H 7/08 | 474/110 |
| 2013/0337954 A1* | 12/2013 | Bauer | F16H 7/08 | 474/110 |
| 2014/0179471 A1* | 6/2014 | Markley | F16H 7/0836 | 474/110 |
| 2015/0354674 A1* | 12/2015 | Markley | F16H 7/0848 | 474/110 |
| 2016/0061299 A1* | 3/2016 | Takagi | F16H 7/0848 | 474/101 |

\* cited by examiner

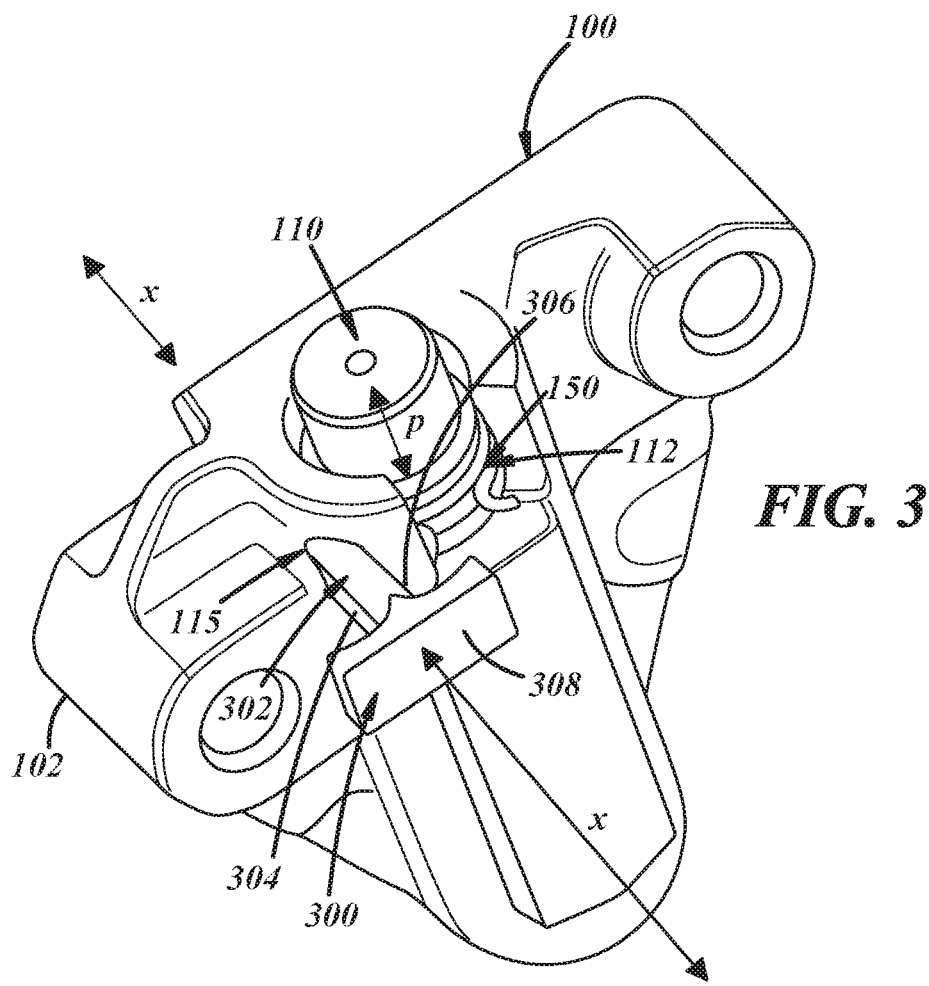
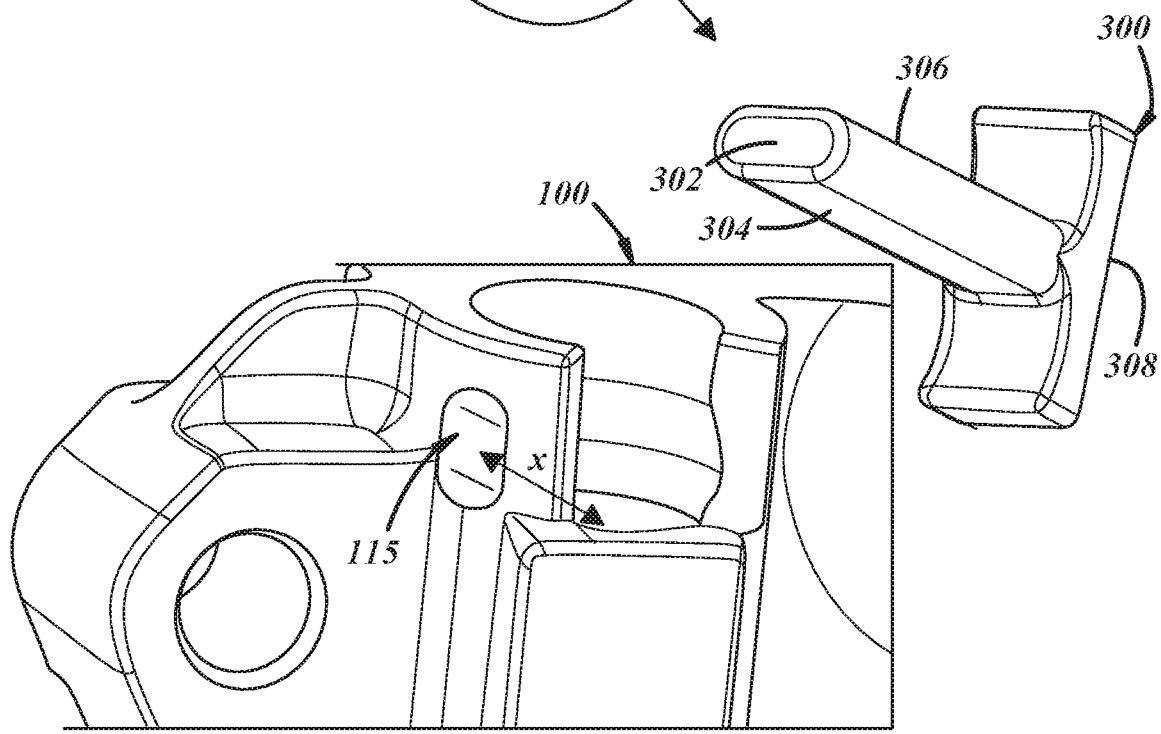
FIG. 3
FIG. 4

HYDRAULIC TENSIONER EXPANDABLE CLIP LOCK

TECHNICAL FIELD

The present application relates to chain tensioner assemblies and, more particularly, to preventing axial movement of a piston of a chain tensioner assembly when the chain tensioner assembly is not installed for use in a vehicle.

BACKGROUND

A chain can be used for translating rotational force between shafts through use of gears and/or sprockets. For example, an internal combustion engine (ICE) of a vehicle can include a crankshaft that is used to create rotational force that ultimately drives one or more wheels of the vehicle. The crankshaft can be synchronized with a camshaft that actuates a series of valves for use in engine piston operation, such as through allowing an air-fuel mixture to flow into a combustion chamber of the ICE that can thereafter be ignited to drive a piston of the engine. The crankshaft and camshaft can be timed using sprockets and a timing chain or timing belt connecting the respective shafts. However, the timing chain can expand or stretch with use. As the timing chain lengthens through wear, it is possible for the chain to become unsecured from one or more sprockets, which can permit the camshaft to move relative to the crankshaft. A chain tensioner can be used to exert a force onto the chain thereby tensioning or taking up slack of the chain as the chain wears thereby preventing the chain from disengaging with the sprocket(s). Chain tensioners installed on an internal combustion engine (ICE) can tension a chain using a piston that moves away from the chain tensioner and toward the chain in response to received pressurized fluid.

SUMMARY

In one implementation, a clip lock for securing an expandable clip of a chain tensioner includes an elongated member having a first surface configured to engage an exterior surface of the chain tensioner and a second surface, spaced apart from the first surface, that is configured to engage the expandable clip and maintain the expandable clip in contact with an annular groove of a chain tensioner component preventing radially-outward expansion and axial movement of the expandable clip with respect to the chain tensioner component while the first surface engages that exterior surface of the hydraulic tensioner and the second surface engages the expandable clip.

In another implementation, a clip lock for securing an expandable chip of a chain tensioner includes a positioning portion having a receiving surface that is configured to engage a chain tensioner component; and an elongated member, attached to the positioning portion, having a first surface configured to engage an exterior surface of the chain tensioner and a second surface, spaced apart from the first surface, that is configured to engage the expandable clip and maintain the expandable clip in contact with an annular groove of a piston preventing radially-outward expansion and axial movement of the expandable clip with respect to the piston while the first surface engages that exterior surface of the chain tensioner and the second surface engages the expandable clip.

BRIEF DESCRIPTION OF THE DRAWINGS

FIG. 3 is a perspective view depicting an implementation of a chain tensioning assembly including a clip lock that is engaged with the assembly;

FIG. 4 is a perspective view depicting an implementation of a chain tensioning assembly including a clip lock that is disengaged with the assembly;

DETAILED DESCRIPTION

A clip lock used with a chain tensioner prevents the axial and radial movement of an expandable clip with respect to a piston of the tensioner before installation in an internal combustion engine (ICE). The clip lock can be sized to be removably positioned with respect to the chain tensioner so that the clip lock simultaneously abuts an external surface of the chain tensioner and abuts the expandable clip preventing the clip from expanding radially outwardly from the piston. The shape and size of the clip lock can be dimensioned such that radial-outward expansion of the clip relative to the piston is prevented when the clip lock abuts both the clip and at least a portion of the external surface of the chain tensioner. Preventing the radial expansion of the expandable clip can also prevent the axial movement of the clip relative to the piston. The piston may include a plurality of grooves that are axially spaced along the length of and extend circumferentially around the piston. The expandable clip fits within any one of these grooves and, as the piston engages a chain and moves away from the chain tensioner, expands radially outwardly to permit axial movement along the piston. As the piston moves further away from the chain tensioner in response to increased lengthening of the chain, the piston can be mechanically prevented from moving closer to the tensioner by the expandable clip that engages one of the grooves in the piston and abuts a shoulder in a clip movement region.

Before installation of the chain tensioner together with the ICE, the piston is placed in a retracted position such that the piston is moved toward the tensioner and the piston is held in that configuration until after the chain tensioner is securely attached to the ICE. The clip lock can include an elongated member comprising a resilient material that occupies a clearance space existing between the expandable clip and the housing that permits the clip to expand radially outwardly away from the piston. This expansion permits the clip to slide axially with respect to the piston allowing the piston to move away from the chain tensioner.

Figure 1:
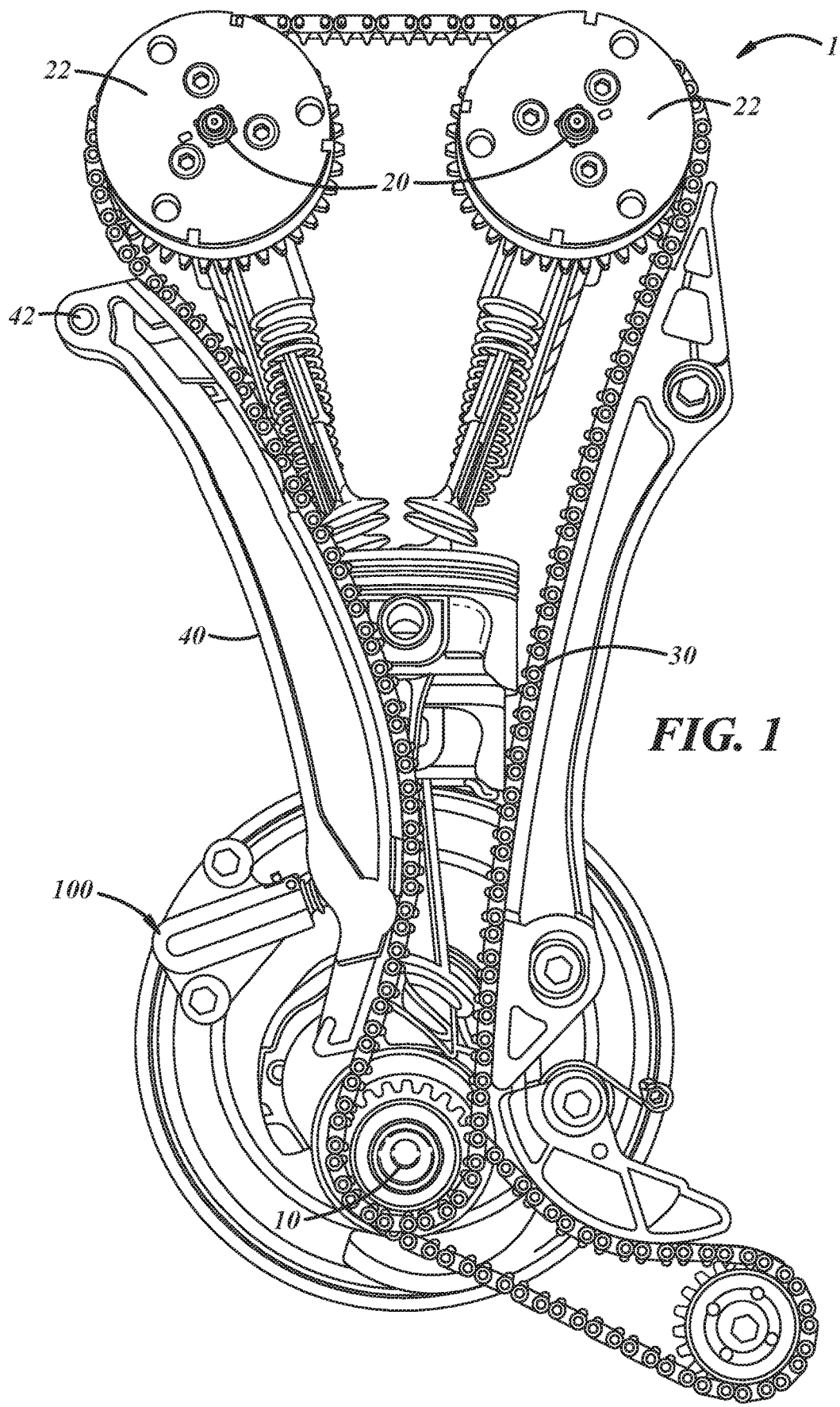
FIG. 1 is a profile view depicting an implementation of a chain tensioning system.

With reference to FIG. 1, a chain tensioning system 1 is shown, including a crankshaft 10, a crankshaft sprocket 12, camshafts 20, camshaft sprockets 22, a timing chain 30, a tensioning arm 40, and a camshaft chain tensioner 100. As shown, the timing chain 30 connects the crankshaft sprocket 12 and the camshaft sprockets 22, which synchronizes the timing of the crankshaft 10 and the camshafts 20. In many embodiments, the camshaft chain tensioner 100 can be a hydraulically actuated camshaft chain tensioner.

The crankshaft 10 can be connected to a plurality of connecting rods, which in turn are connected to a plurality of pistons. Each of the pistons can slide within a cylinder head and communicate with a combustion chamber, where an air-fuel mixture is provided and combusted. The combustion forces the pistons axially within the cylinders, which thereby turns the crankshaft 10. Crankshaft sprocket 12 is connected to the crankshaft 10 and, thus, rotates with the crankshaft 10. The rotational force from the crankshaft 10 can be used to rotate the camshafts 20 through use of the crankshaft sprocket 12, the camshaft sprockets 22, and the timing chain 30, which rotatably connects the crankshaft sprocket 12 and the camshaft sprockets 22.

The camshafts 20 can open and close a plurality of valves as the camshafts rotate. The rotational force from the crankshaft 10 that turns the camshafts 20 can be translated into a linear force that can be used to actuate a plurality of valves, which open and close an inlet that allows an air-fuel mixture to be introduced into the combustion chamber of the engine, as well as to open and close an outlet that allows exhaust gases to escape after combustion.

The timing chain 30 is a chain that can be used to synchronize the rotation of the crankshaft 10 with respect to the camshafts 20. The timing chain 30 can wear and/or stretch over time, and a chain tensioner component, such as a piston, can engage (directly or indirectly) the chain 30 in a way that reduces slack in the chain caused by wear. The timing chain 30 includes a plurality of chain links, each of which engage with one or more teeth on a sprocket, such as the sprockets 12 or 22.

The tensioning arm 40 in the illustrated embodiment is shown as an elongated member that is curved along an interface where the arm 40 abuts the timing chain 30. The tensioning arm 40 can be moved towards the timing chain 30 so as to reduce the amount of slack in the timing chain 30. The tensioning arm 40 is moved by the camshaft chain tensioner 100, which includes a tensioning piston 110 (shown in FIG. 2) that can be used to move the tensioning arm 40 towards the timing chain 30. The tensioning arm 40 can include a single pivot point 42 as shown in FIG. 1, and the tensioning arm-chain interface can be curved and/or shaped in a variety of ways.

Figure 2:
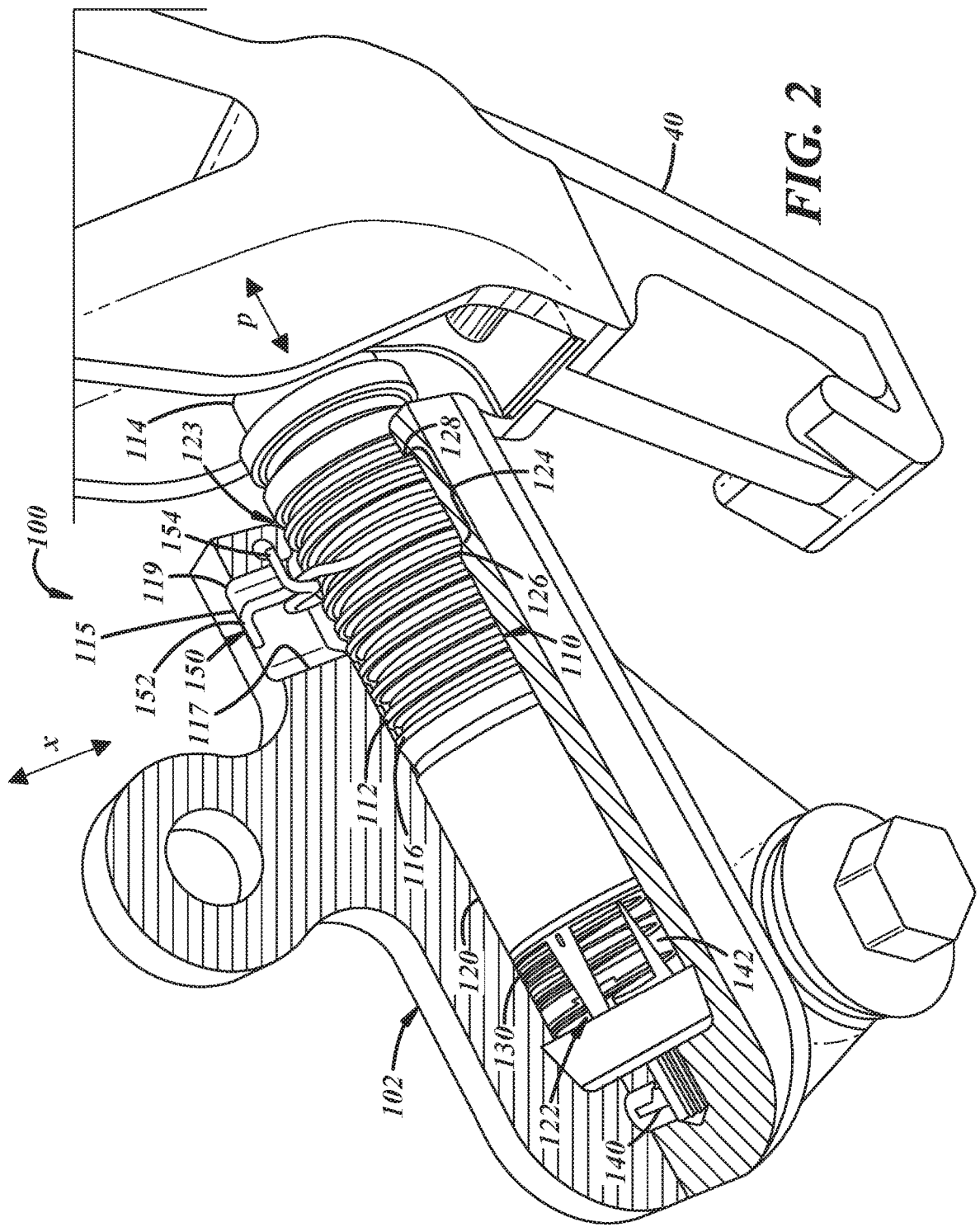
FIG. 2 is a cross-sectional perspective view depicting an implementation of a portion of a chain tensioning assembly that receives a clip lock.

With reference to FIG. 2, there is shown a cross-sectional perspective view of a chain tensioning assembly 100 that can be installed on an internal combustion engine (ICE) (such as the one shown in FIG. 1) with a portion of the housing 102 cut-away so that the interior components can be illustrated. The camshaft chain tensioner 100 includes the housing 102, the piston 110 that is at least partly retained within a piston bore 120, a spring 130, a fluid channel 140, and an expandable clip 150. The housing 102 can substantially surround the piston 110 and can include an opening or cavity that enables protruding ends of the expandable clip 150 to move relative to the housing 102 and the piston bore 110. As mentioned previously, the camshaft chain tensioner 100 can be used to apply force via the piston 110 to the tensioning arm 40 thereby reducing the amount of slack of the chain 30. The piston 110 is at least partly retained in the piston bore 120 and the spring 130 applies a force on the piston 110 in the direction toward the tensioning arm 40, which is in turn abutted against the timing chain 30. Thus, when slack is introduced into the timing chain 30 through wear of the timing chain increasing chain length, the slack can be reduced by the piston 110 being forced by the spring 130 into the tensioning arm 40.

The spring 130 can include a first end that is positioned toward the bottom 122 of the piston bore 120 and that abuts the bottom of the piston bore 120. A second end of the spring 130 can abut an end portion of piston 110, such as the underside of the piston head 114, or another component such that the piston 110 is forced out of the piston bore 120 and towards the tensioning arm 40. In one embodiment, the spring 130 can be a low-tension spring and can be constructed of metal alloy or similar resilient material.

The fluid channel 140 can include a path used to communicate fluids, such as oil or other hydraulic fluids, into a fluid chamber 142 that is situated at or near the bottom of the piston bore 120. Additionally, a fluid retention component can be positioned between the bottom of piston bore 120 and the body of piston 110, such that the fluid chamber 142 is defined by the bottom of piston bore 120 and the piston retention component. In one embodiment, the fluid retention component 144 can be a part of piston 110, such as the underside of the piston head 114, and, in other embodiments, the fluid retention component 144 can be positioned between the spring 130 and the piston 110. The fluid retention component acts to retain the fluid received from the fluid channel 140 within the fluid chamber 142. As the piston 110 is extended out of the piston bore 120, the volume of the fluid chamber 142 increases, which causes more fluid to be communicated through the fluid channel 140 and into the fluid chamber 142. And, in some embodiments, the fluid channel 140 can include a check valve that allows fluid to be communicated into the fluid chamber 142 when the piston extends and that prevents communication back through the fluid channel 140 thereby preventing piston retraction.

The piston 110 is shown as including a plurality of grooves 112 and a piston head 114. The piston head 114 acts as a piston-tensioning arm interface and can be coupled to the tensioning arm 40 in a variety of different ways, such as through abutment and/or mechanical attachment. The piston 110 includes grooves 112 on an exterior circumferential surface of piston 110 and, in at least one embodiment, the piston 110 can include a single groove 112 that can be positioned either near the top of the piston or near the bottom of the piston, such as near or towards the opening 123 of the piston bore 120 or the bottom 122 of the piston bore 120, respectively. The grooves 112 of the piston 110 can be formed from a reduced diameter portion of the piston that extends an axial length roughly corresponding to the cross-sectional diameter of the expandable clip 150. The grooves 112 include surfaces that extend radially inward or radially outward such that the diameters or circumferences of the piston 110 varies so that the expandable clip 150 can permit extension of the piston 110, but disallow retraction of the piston 110, as explained more below. The grooves 112 can be formed in a variety of different ways and, in one embodiment, can include angled walls that slant the exterior circumferential surface of the piston. In another embodiment, the grooves 112 can be formed of smooth, curved indentations that are shaped to engage the expandable clip 150, which can include a curved cross-section, such as a circular or elliptical cross-section. And, in many embodiments, the grooves 112 can include asymmetrical walls that facilitate the ratcheting operation of the expandable clip along the exterior circumferential surface 116 of the piston 110. These asymmetrical walls can be positioned at different angles relative to the axial direction of the piston 110.

The piston bore 120 can include an inner diameter that is suitable for extending and retracting the piston 110 throughout. The inner diameter can correspond to a diameter of the piston 110 at an upper shoulder of the grooves 112 so that the piston 110 including the grooves 112 can axially slide within piston bore 120. Additionally, the piston bore 120 can also include a clip movement region 124 that permits the expandable clip 150 to move axially relative to the piston 110.

The expandable clip 150 engages the exterior circumferential surface 116 of the piston 110 and is positioned axially within the clip movement region 124. The expandable clip 150 can be constructed of metal or another similarly resilient material, as well as any suitable material that permits resilient expansion of the expandable clip 150 such that the clip 150 can expand to an expanded diameter and return to a resting diameter. The resting diameter can correspond to a diameter of the exterior circumferential surface 116 of piston 110 at a region where the clip 150 engages the piston 110, such as within a groove 112. In this way, the expandable clip 150 can be configured to fit around the exterior circumferential surface 116 and, also, can be designed to fit within grooves 112. The expandable clip 150 can include a first leg 152 at one end of the clip 150 and a second leg 154 at another end of the clip. As the expandable clip 150 expands radially outwardly, the first leg 152 moves relative to the second leg 154. It is possible to constrain the movement of the first leg 152 relative to the second leg 154 to prevent the radial expansion of the expandable clip 150.

The clip movement region 124 is a cavity within the piston bore 120 that is defined by an axial section of the piston bore 120 that includes a larger inner diameter relative to the inner diameter of other axial portions of the piston bore 120 so that axial movement of the clip 150 along axis (p) is permitted. Additionally, the clip movement region 124 can include a lower shoulder 126 and an upper shoulder 128. The upper shoulder 128 can include a surface that runs orthogonal to the axial axis of the piston bore 120 and, thus, when the piston 110 is extended outward from the piston bore 120, the expandable clip 150 is retained within the clip movement region 124 by the upper shoulder 128. When the piston 110 is extended, the expandable clip 150 is forced by a first groove 112 to abut the upper shoulder 128 and, when sufficient axial force is applied, the expandable clip 150 expands to an expanded diameter thereby permitting the clip 150 to move axially with respect to the groove 112 and piston 110. After moving axially relative to the groove 112, the expandable clip 150 may become positioned in another groove adjacent to and axially spaced from the first groove and may return to its resting diameter.

The lower shoulder 126 of the clip movement region 124 includes a slanted or angled wall that does not permit the expandable clip 150 to expand to the expanded diameter and, thus, prevents the expandable clip 150 from moving axially relative to the grooves 112, as well as prevents retraction of the piston 110 within the piston bore 120. When the piston 110 is forced into the piston bore 120 away from the timing chain 30, the expandable clip 150 can abut the slanted or angled wall of the lower shoulder 126 thereby compressing the expandable clip 150 between the slanted wall and the exterior circumferential surface 116 of the piston 110. Compression of the expandable clip 150 restricts expansion of the expandable clip 150 so that the piston 110 cannot be retracted further within the piston bore 120.

The housing 102 includes a clearance space 115 positioned within the clip movement region 124 so that the space 115 extends into the piston bore 120 adjacent to the piston 110. The clearance space 115 slidably receives a clip lock 300 (shown in FIG. 3) and is dimensioned so that one surface of the clip lock 300 abuts an exterior surface of the chain tensioner 100 and another surface of the clip lock 300 abuts and engages an exterior surface of the expandable clip 150. The clearance space 115 includes a first shoulder 117 and a second shoulder 119 that prevent the clip lock from moving axially with respect to the piston 110 and away from the expandable clip 150. In some implementations, the first shoulder 117 and the second shoulder 119 are positioned at each end of the clip movement region 124 such that the distance between the first shoulder 117 and the second shoulder 119 is the same as the length of the clip movement region 124 measured along the axis of piston movement (p). When the clip lock 300 is inserted into the clearance space 115, the lock 300 can prevent the expandable clip 150 from expanding radially outwardly away from the piston 110 regardless of the axial position of the clip 150 within the clip movement region 124. The clearance space 115 can have a cross-sectional shape that closely conforms to the cross-sectional shape of the clip lock 300 in a way that the clearance space 115 receives the clip lock 300 and the outer surfaces of the clip lock 300 abut the inwardly facing surfaces of the space 115. It is possible that the housing 102 is metal created as part of a casting process and the clearance space 115 is created as part of metal casting the housing 102. Or in another implementation, the clearance space 115 can be formed after the housing 102 has been formed out of metal, such as by using one or more of a variety of different metal cutting techniques to cut a previously formed housing 102.

Figure 5:
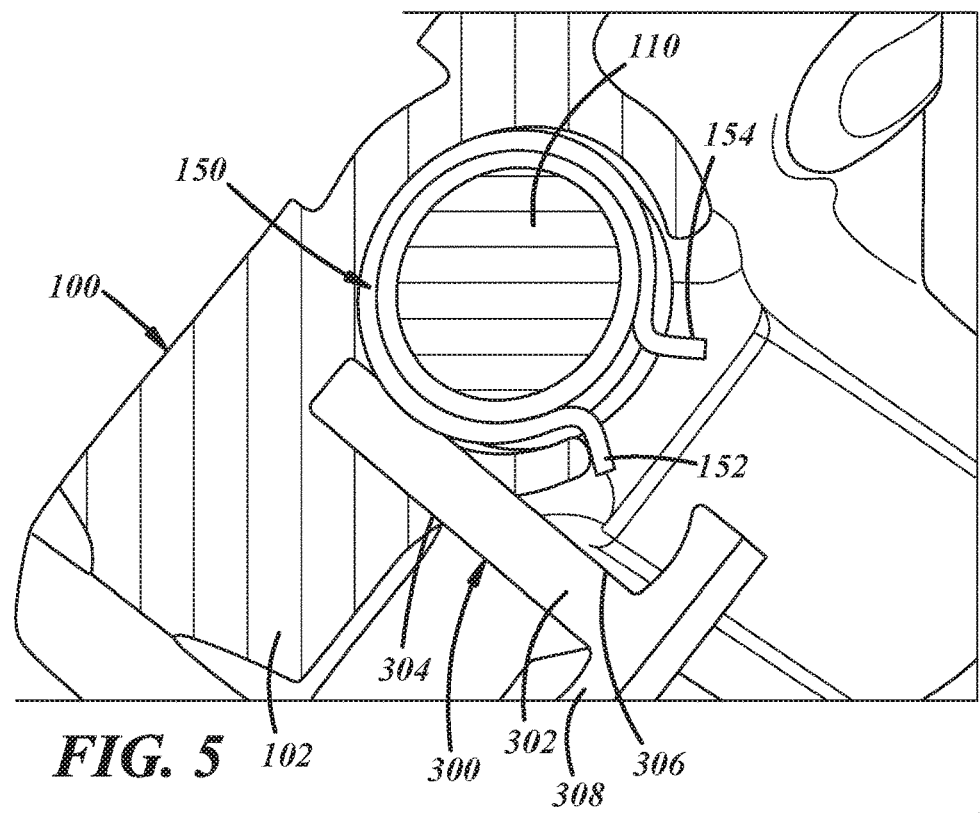
FIG. 5 is a perspective view depicting a portion of an implementation of a chain tensioning assembly including a clip lock.

Turning to FIGS. 3-5, the chain tensioning assembly 100 is shown with an implementation of a clip lock 300 engaged with the housing 102 and the expandable clip 150 (FIGS. 3 and 5) positioned within the clearance space 115, as well as with the clip lock 300 removed from the clearance space 115 and disengaged from the housing 102 (FIG. 4). In this implementation, the clip lock 300 includes an elongated member 302 having a first surface 304 and a second surface 306. The first surface 304 abuts the housing 102 and the second surface 306 abuts and engages the expandable clip 150 when the clip lock 300 is inserted into the clearance space 115. In this implementation, the first surface 304 and the second surface 306 of the clip lock 300 are planar. However, it should be appreciated that the first surface and the second surface of the clip lock 300 can be any one of a variety of shapes, depending on a cross-sectional shape of the elongated member 302. For example, if the elongated member has a circular cross-section as measured perpendicularly to the axis of insertion (x) along the elongated member, the first and second surfaces may not be planar, but rather each exist as a line where the elongated member contacts the housing 102 or the expandable clip 150, respectively. It is possible for the elongated member to have any one of a variety of different cross-sectional shapes. In another example, the elongated member can have a triangular cross-sectional shape so that the first surface and/or the second surface of the elongated member are articulated relative to the axis of insertion (x) by a non-zero number of degrees. The articulation of the first surface and/or the second surface can direct force radially-inwardly toward the piston 110 so that the expandable clip 150 is directed into a portion of the annular groove 112. In some implementations, the second surface 306 can include a groove that closely conforms to the outer surface of the expandable clip 150 to further prevent movement axially with respect to the piston 110.

A handle 308 can be attached to an end of the elongated member 302 to facilitate insertion and removal of the clip lock 300 with respect to the chain tensioning assembly 100. The handle 308 can be shaped in a way that minimizes the thickness of the chain tensioning assembly 100 as measured along the axis of insertion (x) when the clip lock 300 is installed. The handle 308 shown in the figures is a planar element that fixedly couples with the end of the elongated member 302 by mechanical attachment, such as welding. In one implementation, the elongated member 302 and the handle 308 can be formed as a unitary structure, such as could be created through a plastic injection molding process. The handle 308 can lie close to or against the housing 302 when the clip lock 300 is installed. This arrangement can reduce the size of packaging surrounding the chain tensioning assembly 100 used during shipment from location where the assembly 100 is assembled to a location where the assembly 100 is installed on a vehicle.

While the clip lock 300 is inserted into the housing 102 so that the first surface 304 engages the housing 102 and the second surface 306 engages the expandable clip 150, the clip 150 is prevented from expanding radially outwardly from the piston 110 away from the grooves 112. The piston 110 is inhibited from moving along the axis (p) while the expandable clip 150 is engaged with a groove formed in the piston 110. The clip lock 300 can remain engaged with the chain tensioner 100 during shipment and before installation on an ICE. Alternatively, the clip lock 300 can be used to service the ICE, such as during the removal and replacement of a timing chain. After the chain tensioner 100 is installed on the ICE, the clip lock 300 can be removed from the tensioner 100 to allow the expandable clip 150 to expand radially outwardly relative to the piston 110. The radial expansion of the expandable clip 150 permits the piston 100 to move away from the chain tensioner 100 and toward a chain while the clip 150 slides axially relative to the piston 100 yet remains constrained within the clip movement region 124.

Figure 6:
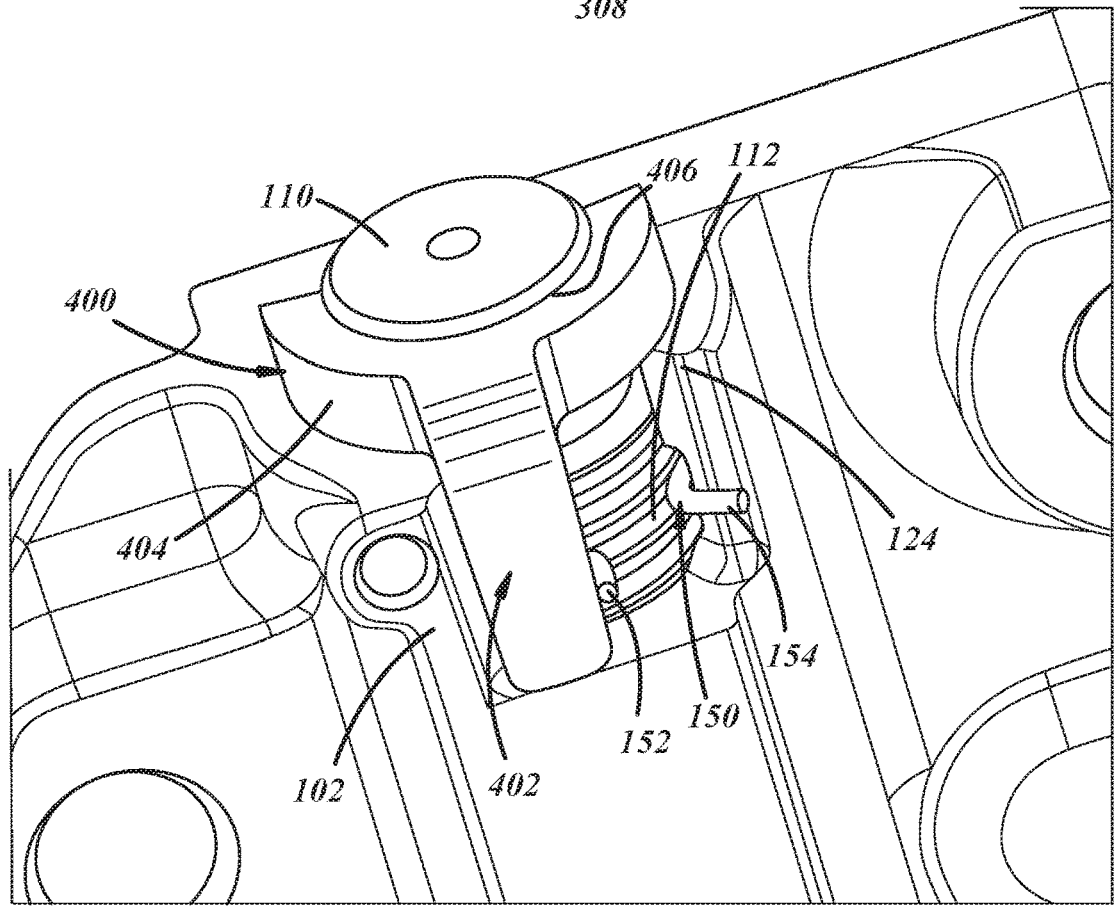
FIG. 6 is a perspective view depicting a portion of an implementation of a chain tensioning assembly including another implementation of a clip lock.

Another embodiment of the clip lock 400 is shown in FIG. 6. The clip lock 400 includes an elongated member 402 and a positioning portion 404 attached to an end of the elongated member 402. The positioning portion 404 includes a receiving surface 406 that engages the piston 110 at a location that is axially spaced relative to the expandable clip 150. The elongated member 402 extends away from the positioning portion 404 to engage the housing 102 of the chain tensioning assembly 100 and the first leg 152 or second leg 154. The cross sectional area of the elongated member 402 can gradually reduce from a point where the member 402 connects with the positioning portion 404 extending to a distal end of the member 402. The orientation of the elongated member 402 relative to the positioning portion 404 can be configured to both accurately position the elongated member 402 between the housing 102 and the first leg 152/second leg 154 as well as hold the elongated member 402 in this position. The decreasing cross-sectional area of the elongated member 402 can act as a wedge along with the positioning portion 404 to hold the clip lock 400 with respect to the chain tensioning assembly.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A clip lock for securing an expandable clip of a chain tensioner, comprising:
an elongated member having a first surface configured to engage an exterior surface of the chain tensioner and a second surface, spaced apart from the first surface, that is configured to engage the expandable clip and maintain the expandable clip in contact with an annular groove of a chain tensioner component preventing radially-outward expansion and axial movement of the expandable clip with respect to the chain tensioner component while the first surface engages that exterior surface of the hydraulic tensioner and the second surface engages the expandable clip.

2. The clip lock recited in claim 1, further comprising a groove formed in the second surface.

3. The clip lock recited in claim 1, wherein the chain tensioner component is a piston received within a piston bore formed in a housing.

4. The clip lock recited in claim 1, wherein the elongated member has a substantially circular cross-sectional shape.

5. The clip lock recited in claim 1, wherein the first surface and the second surface are planar.

6. The clip lock recited in claim 1, further comprising a handle connected to the elongated member.

7. The clip lock recited in claim 6, wherein the handle is planar.

8. A clip lock for securing an expandable clip of a chain tensioner, comprising:
a positioning portion having a receiving surface that is configured to engage a chain tensioner component; and
an elongated member, attached to the positioning portion, having a first surface configured to engage an exterior surface of the chain tensioner and a second surface, spaced apart from the first surface, that is configured to engage the expandable clip and maintain the expandable clip in contact with an annular groove of a piston preventing radially-outward expansion and axial movement of the expandable clip with respect to the piston while the first surface engages that exterior surface of the chain tensioner and the second surface engages the expandable clip.

9. The clip lock recited in claim 8, further comprising a groove formed in the second surface.

10. The clip lock recited in claim 8, wherein the chain tensioner component is a piston received within a piston bore formed in a housing.

11. The clip lock recited in claim 8, wherein the elongated member has a substantially circular cross-sectional shape.

12. The clip lock recited in claim 8, wherein the first surface and the second surface are planar.

13. The clip lock recited in claim 8, further comprising a groove formed in the second surface.

14. The clip lock recited in claim 8, wherein the chain tensioner component is a piston received within a piston bore formed in a housing.

15. The clip lock recited in claim 8, wherein the elongated member engages a first leg of the expandable clip.

16. The clip lock recited in claim 8, wherein the positioning portion comprises a decreasing cross-sectional area.

17. The clip lock recited in claim 8, wherein the elongated member is attached to the positioning portion at a distal end.

\* \* \* \* \*